INVENTOR.
ARTHUR E. VOGEL
BY Schmieding and Fultz
ATTORNEYS

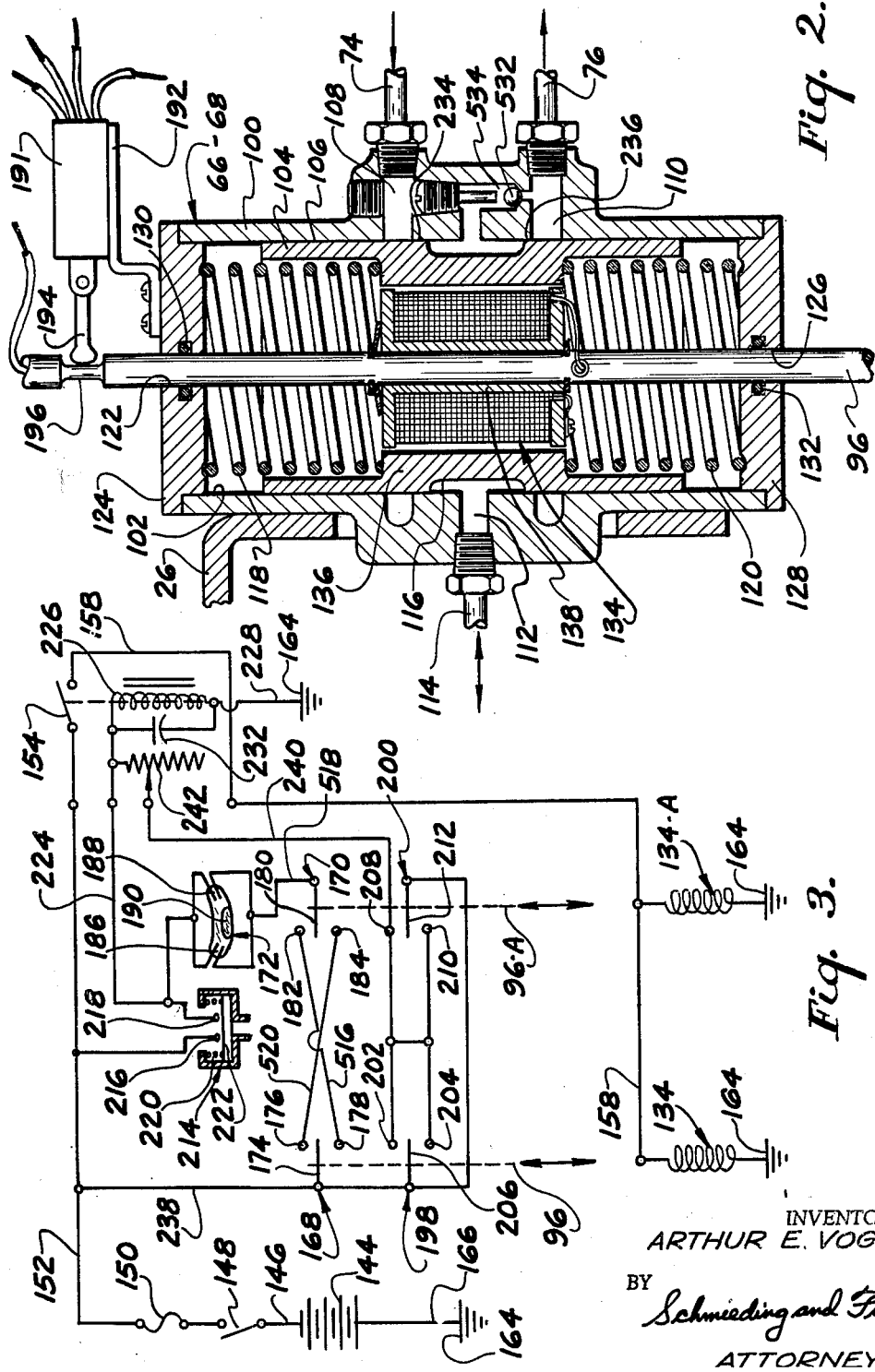

INVENTOR.
ARTHUR E. VOGEL
BY
Schmieding and Fultz
ATTORNEYS

INVENTOR.
ARTHUR E. VOGEL
BY Schmieding and Fultz
ATTORNEYS

INVENTOR.
ARTHUR E. VOGEL
BY
Schmieding and Fultz
ATTORNEYS

INVENTOR.
ARTHUR E. VOGEL

_United States Patent Office_

3,181,878
Patented May 4, 1965

3,181,878
ELECTROMAGNETIC CONTROL SYSTEM FOR FLUID ACTUATED SUSPENSION SYSTEM
Arthur E. Vogel, Columbus, Ohio, assignor, by direct and mesne assignments, of one-half to Dawson-Vogel Engineering Company, a partnership, one-fourth to Warren H. F. Schmieding, and one-fourth to Palmer Fultz, all of Columbus, Ohio
Filed Dec. 15, 1959, Ser. No. 859,611
34 Claims. (Cl. 280—6.1)

This invention relates to suspension systems for vehicles and particularly to improved control apparatus for said systems.

In general, the systems of the present invention incorporate novel valve means operatively connected between sprung and unsprung weights of the vehicle that include actuators that are selectively electro-magnetically connected and disconnected between said weights to control the admission and release of fluid to the spring means interposed between said weights.

These magnetic valve means are operatively associated with novel electrical detection and control circuits that sense variations in substantially all of the forces and conditions to which a vehicle is subjected such as the forces that cause the occurrence of variations in body height, roll in cornering, and braking effect or nose dive.

The above mentioned electrical detection and control circuits sense variations in each of the various forces independently of the others and command said electromagnetic valve means to act appropriately to either admit or release fluid to either increase or decrease pressures in the spring means of the vehicle.

It is therefore an object of the present invention to provide improved valve means for controlling the flow of fluid to a vehicle suspension system which valve means are operatively interposed between the sprung and unsprung weights of the vehicle by electro-magnetic connections which connections are made only at times when it is necessary or desirable to make a correction in the fluid pressures in the suspension system. Hence, the valve is not constantly cycled by road irregularities whereby long valve life, savings in horse power, and reliability of operation are achieved at minimum cost.

It is another object of the present invention to provide novel electrical detection and control circuits which independently sense the various forces to which a vehicle is subjected and control a valve means so as to make appropriate corrections in the fluid pressures in the vehicle suspension system.

It is another object of the present invention to provide improved control systems for vehicle suspension systems that incorporate novel electrical circuits that not only make appropriate corrections responsive to variations in forces imposed on the vehicle, but which also eliminate all undesirable transition sensations, at curve entry and curve exit, whereby superior riding comfort and safety are achieved.

It is still another object of the present invention to provide a simplified control apparatus for a vehicle suspension system which is partially automatically actuated and partially manually actuated to provide the advantages of more complex systems with simplicity of structure and low cost.

Further objects and advantages of the present invention will be apparent from the following description, reference being had to the accompanying drawings wherein preferred forms of embodiments of the invention are clearly shown.

In the drawings:
FIG. 1 is a diagrammatic view of a suspension system constructed according to the present invention and comprising one aspect thereof;

FIG. 2 is a side sectional view of a magnetic valve means constructed according to the present invention, the section being taken along a vertical plane through the central line of the valve means;

FIG. 3 is a diagrammatic view of an electrical circuit comprising a portion of the control means for the suspension system of FIG. 1;

Figure 1:
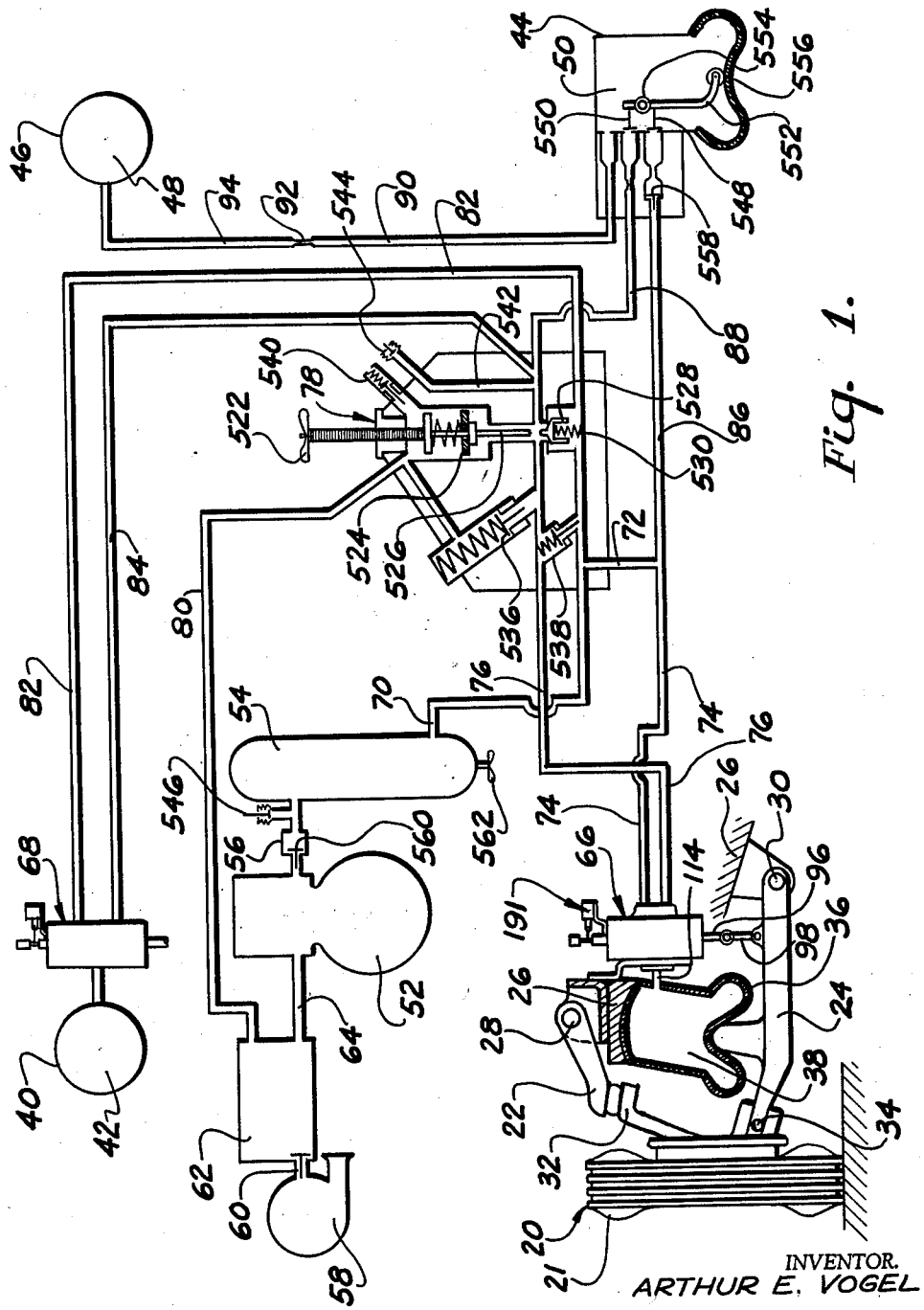

Referring in detail to the drawings, FIG. 1 illustrates an unsprung weight portion 20 that includes a right front wheel 21 of a vehicle connected to an upper control arm 22 and a lower control arm 24, said control arms being pivoted to a frame 26 at pivots 28 and 30. The other ends of the control arms are pivoted to unsprung weight 20 at pivots 32 and 34.

A right front air spring 36 is interposed between sprung weight or frame 26 and unsprung weight 20 and includes a chamber 38.

A left front air spring 40 includes a chamber 42 as is shown diagrammatically in the upper portion of FIG. 1.

A rear right air spring 44 and rear left air spring 46 are seen on the right side of the diagrammatic view of FIG. 1 and include chambers 48 and 50.

With continued reference to FIG. 1, the system includes a compressor 52 that supplies air to a high pressure reservoir 54 via check valve 56.

Air is supplied to compressor 52 via a filter 58, check valve 60, low pressure reservoir 62, and line 64.

The front air chambers 38 and 42 receive and release air through a right magnetic valve means indicated generally at 66 and a left magnetic valve means indicated generally at 68.

Right valve means 66 receives air from high pressure reservoir 54 via lines 70, 72, and 74 and said valve means releases air to low pressure reservoir 62 via lines 76, lift control valve 78, and line 80.

Left magnetic valve means 68 receives air from high pressure reservoir 54 via line 70 and line 82 and releases air to low pressure reservoir 62 via line 84, lift valve means 78, and line 80.

Rear right air chamber 50 receives air from high pressure reservoir 54 via line 70, line 72, and line 86 and releases air to low pressure reservoir 62 via line 88, lift valve 78, and line 80.

Right rear air chamber 48 receives air from high pressure reservoir 54 via line 70, line 72, line 86, right air chamber 50, line 90, and restriction 92 and line 94 and releases air to low pressure reservoir 62 via line 94, restriction 92, line 90, chamber 50, line 88, lift valve 78, and line 80.

With reference to FIGS. 1 and 2, valve means 66 and 68 each include an actuating rod 96 connected to a link 98 which is in turn connected to lower control arm 24, as seen in FIG. 1.

With reference to FIG. 2, valve 66 includes a casing 100 having a cylindrical inner surface 102 in which is slidably fitted a spool 104. Spool 104 is shown in its centered position wherein its outer surface 106 covers intake port 108 and exhaust port 110. A third port 112 communicates with air chamber 38 via line 114. Third port 112 communicates with a necked portion 116 in spool 104 and when spool 104 is raised, necked portion 116 connects intake line 74 with line 114 via port 108, necked portion 116 and port 112. When spool 104 is in the lower position line 114 is connected with exhaust line 76 via third port 112, necked portion 116 and port 110.

Spool 104 is normally maintained in the centered position illustrated by upper and lower compression springs 118 and 120.

Rod 96 is slidably mounted in a hole 126 in lower plug 128, the resilient seals 130 and 132 being provided between the outer surface of rod 96 and the end plugs.

The central portion of rod 96 carries an electromagnetic coil 134. Assuming that coil 134 is not energized rod 96 and coil 134 are free to move up and down relative to both housing 100 and spring centered spool 104. Assuming, however, that coil 134 is energized, in a manner later to be described herein, then a central portion 136 of spool 104 is magnetically coupled to an armature 138. It will be understood that the magnetic flux follows a path defined by the tubular central armature portion, radially outwardly extending end armature flanges, and central spool portion 136.

Since the central spool portion 136 is disposed in a location of high flux density, it will be understood that a strong magnetic coupling is achieved between rod 96 and spool 104. Hence, when coil 134 is energized spool 104 will follow the vertical movements of the rod.

Reference is next made to FIG. 3 which diagrammatically illustrates an electrical circuit for energizing right and left electromagnetic coils 134 and 134–A located in the valve means 66 and 68 respectively, the latter being illustrated in FIG. 1.

Coils 134 and 134–A are energized from battery 144 via wire 146, switch 148, fuse 150, wire 152, relay armature 154, wire 158, ground 164 and thence to battery 144 via wire 166.

Sensing of roll is accomplished by a right roll control switch indicated generally at 168, a left roll control switch indicated generally at 170, and a centrifugally actuated mercury switch indicated generally at 172. Right roll control switch 168 is composed of a movable contact 174 and stationary contacts 176 and 178. Similarly, left roll control switch 170 includes movable contact 180 and stationary contacts 182 and 184.

The longitudinal axis of centrifugally actuated mercury switch 172 is disposed transversely of the longitudinal axis of the vehicle such that either a right pair of contacts 186 or a left pair of contacts 188 are bridged by a blob of mercury 190 when the vehicle is curving either to the right or to the left.

It should be pointed out that stationary contacts 176, 178, 182, and 184 are carried on the sprung weight or frame of the vehicle in a switch body 191 and on a bracket 192 as seen in FIGS. 1 and 2. Movable contacts 174 and 180 are pivotally mounted to the sprung weight or frame 26 but are connected to the unsprung weight of the vehicle via pivoted arm 194 and an annular recess 196 on the upper end of control rod 96.

With continued reference to FIG. 3, the circuit also includes right and left height control switches indicated generally at 198 and 200. Right height control switch 198 includes stationary contacts 202 and 204 and movable contact 206. Similarly, left height control switch 200 includes stationary contacts 208 and 210 and movable contact 212. Here again, the stationary contacts are carried on the frame or sprung weight and are contained within switch body 191 and on a bracket 192. Also, movable contacts 206 and 212 are pivoted relative to the frame and connected to the unsprung weight by means of pivoted arm 194 and recess 196 in control rod 96.

An anti-nose dive switch indicated generally at 214 comprises contacts 216 and 218 that are normally maintained open by a coil spring 220 which biases a conductor diaphragm 222 away from the contacts. The lower side of conductor diaphragm 222 is exposed to the fluid in the conventional hydraulic brake system such that upon application of the brakes the diaphragm is moved upwardly, against the action of spring 220, whereby contacts 216 and 218 are bridged.

It will now be understood that the contacts 216 and 218 are bridged upon application of the vehicle brakes whereby coils 134 and 134–A are energized to institute instantaneous coupling of the rod 96 with the spool 104, as seen in FIG. 2.

When rod 96 and spool 104 are magnetically coupled, valve means 66 and 68 become operative to effect a nose dive correction, it being understood that upon braking, when the nose of the car tends to dive, spool 104 moves upwardly and connects pressure lines 74 and 82 with their respective chambers 38 and 42 via ports 108, necked portion 116, port 112, and line 114. This immediately increases the pressure in front air chambers 38 and 42 whereby diving of the nose of the vehicle is prevented.

Coils 134 and 134–A are energized via battery 144, wire 146, switch 148, fuse 150, wire 152, contact 216, conductor diaphragm 222, contact 218, wire 224, relay coil 226, wire 228 to ground 164 and thence to battery 144 via wire 166. Relay coil 226 having been energized closes relay actuated switch 154 and causes current to flow from wire 152 to coils 134 and 134–A via wire 152, relay actuated switch 154, and wire 158.

After a nose dive correction has been made and when the braking pressure is released, under conductor diaphragm 222, contacts 216 and 218 are opened whereby coils 134 and 134–A are de-energized, after a time delay, to break the magnetic connection between rod 96 and spool 104.

It should be emphasized that coils 134 and 134–A are not immediately de-energized upon breaking of the contacts 216 and 218 at brake switch 214 due to the inclusion of a capacitor 232 which shunts relay coil 226, the residual charge in said capacitor serving to maintain relay actuated switch 154 closed for an interval of time during which the coils 134 and 134–A are maintained energized.

This time delay, provided by capacitor 232, allows valve means 66 and 68 to remain operative and serve their function of releasing excess fluid from air springs 38 and 42 back to low pressure reservoir 62.

It should be pointed out that whenever valve means 66 and 68 are energized they serve the function of admitting or releasing fluid to or from air chambers 42 and 38 as required to maintain a constant distance between the sprung and unsprung portions of the vehicle.

With reference to FIG. 2 it will be noted that when valve means 66 and 68 are at the neutral datum line position there is an upper clearance 234 between the thresholds of port 108 and recess 116 and there is also a lower clearance 236 between the thresholds of port 110 and recess 116. These clearances 234 and 236 provide a "dead band" or zone of inaction through which spool 104 can move without effecting an interconnection between the various ports. Due to the presence of the above mentioned "dead band" even though the valves 66 and 68 are energized they will not institute corrections when minute road irregularities are encountered.

It will be understood that since valves 66 and 68 function to maintain a constant distance between the sprung and unsprung weights in the manner previously described, then hence serve to accomplish this under variations in the static load of the vehicle. It is, however, necessary to provide appropriate sensing and control means and this is done, in the present systems, by electrical circuitry.

The height control switches 198 and 200 of FIG. 3 are so arranged in the circuit that when either or both of the movable contacts 206 and 212 bridge a lower contact 204 or 210 or both or an upper contact 202 or 208 or both, for any extended period of time, then coils 134 and 134-A are again energized by closing of relay actuated switch 154 but the circuit for accomplishing this is different from the circuit explained in connection with brake switch 114. Here the connection to the relay coil 226 is via battery 144, wire 146, on-off switch 148, fuse 150, wire 152, wire 238, switch 198 or 200, wire 240, variable resistance 242, wire 224, relay coil 226 and wire 228 to ground.

Here the capacitor 232 that shunts relay coil 226 in combination with variable resistance 242 serve a very important function of imparting a time delay betewen the closing of height control switch 198 or 200 and the resulting energization of coils 134 and 134-A. This time delay prevents the institution of a height correction when mere road irregularities are encountered. Hence, a sustained change in height as occurs with changes in static loading of the vehicle is necessary to keep either switch 198 or switch 200 closed for a sufficient period of time to charge relay coil 226 and close relay actuated switch 154, such time period being required due to the electrical characteristics of the resistor-capacitor relay circuit.

Referring again to FIGS. 2 and 3, roll control corrections are accomplished by right roll control switch 168 and left roll control switch 170. Assuming the vehicle enters a curve to the right, movable contact 174 is caused to bridge stationary contact 178 and movable contact 180 is caused to bridge stationary contact 182 since actuating rod 96 on the right side of the vehicle departs downwardly and the other actuating rod 96-A departs upwardly, as viewed in FIG. 3, said rod movements being relative to the frame or sprung weight. At the same time the blob of mercury 190 is thrown to the left by inertia forces whereby the blob bridges contacts 188 completing a circuit to coils 134 and 134-A via battery 144, wire 146, switch 148, fuse 150, wire 152, wire 238, movable contact 174, stationary contact 178, wire 516, stationary contact 182, movable contact 180, wire 518, mercury switch 172, wire 224, relay coil 226, and wire 228 to ground 164. This closes relay actuated switch 154 which completes the circuit to coils 134 and 134-A via wire 158.

Assuming the vehicle is curving to the left the circuit to coils 134 and 134-A will be completed in the manner just described except that current will pass from right roll control switch 168 to left roll control switch 170 via a wire 520 that connects the other stationary contacts 176 and 184. Also, due to the inertia forces to the right, blob of mercury 190 connects contacts 186 instead of contacts 188.

Assuming that coils 134 and 134-A are energized when the vehicle enters a curve, the valve means 66 and 68 will sense the directions of sprung weight departure, at the right and left sides of the vehicle, and apply appropriate corrections in the manner previously described in connection with height corrections.

After a roll correction has been established, to maintain the sprung weight level for the particular radius of curve being encountered, the correction will be maintained so long as the vehicle is curving and moreover valve means 66 and 68 will sense variations in curve radius and vehicle velocity and modulate to maintain the sprung weight at normal configuration datum for the various forces encountered.

When the vehicle reaches curve exit it is desirable to maintain coils 134 and 134-A energized for a time interval after the inertia forces have terminated in order to permit valve means 66 and 68 to re-establish normal configuration datum without unpleasant transition sensations. It is necessary for valve means 66 and 68 to release excessive pressures at the spring means towards the outside of the curve and to restore normal pressures at the spring means towards the center of the curve. Further, it is desirable to restore these pressures quickly, without time delay. Such rapid restorations of normal pressures, at curve exit, are achieved since capacitor 232 drains into relay coil 226 and maintains switch 154 closed and coils 134 and 134-A energized whereby valve means 66 and 68 are maintained responsive for the time interval during which capacitor 232 is discharged.

With reference to FIGS. 1 and 2 the system is provided with lift control which is accomplished by means of the previously mentioned lift control valve 78. When it is desired to increase the road clearance all of the air chambers 38, 50, 42, and 48, are simultaneously pressurized by screwing valve handle 522 downwardly to seat valve element 524 whereby line 80 back to low pressure reservoir 62 is closed. At the same time a lower end 526 of valve handle 522 opens valve element 528 against the action of spring 530 whereby high pressure air is released from high pressure reservoir 54 via line 70, valve 528 and lines 76, 88, 84, 90, and 94 leading to the air chambers 38, 50, 42, and 48.

It will be understood that the low pressure lines, such as line 76 in FIG. 2, are now pressurized whereby check valve 532 is unseated permitting high pressure air to pass to the air springs via a passage 534, necked portion 116, port 112 and line 114 leading to air chamber 38.

The maximum pressure available for lift is limited to a predetermined value by a pressure relief valve 536 located between line 76 and line 80.

In the event the air pressure in high pressure reservoir 54 is excessively high, and valve 528 is in its normal closed position, a pressure relief valve 538 releases air from high pressure reservoir 54 to the low pressure reservoir 62 via line 70, pressure relief valve 538, freely through lift control valve 78 and line 80 back to low pressure reservoir 62.

The low pressure circuit includes a pressure relief valve 540 and a line 542 leads to a fitting 544, the latter providing means for attaching a test pressure gauge to test pressures in the low pressure circuit. The high pressure circuit includes a similar pressure test fitting 546.

With reference to FIG. 1 the admission of air to rear air chamber 50 is accomplished by a poppet valve 548 and the release of air is accomplished by a poppet valve 550 said poppet valves being actuated by a lever 552 pivoted to the sprung weight at a pivot 554, the lower end 556 of said lever being operatively associated with the unsprung weight.

A check valve 558 is provided in line 86 to prevent leakage of air from chamber 50 when a pressure in line 86 is at a lower value than in the chamber 50.

A check valve 560 is interposed between compressor 52 and high pressure reservoir 54 to provide a unidirectional flow of fluid between the units.

In addition, high pressure reservoir 54 includes a drain 562 for releasing any condensation which may accumulate.

Figure 8:
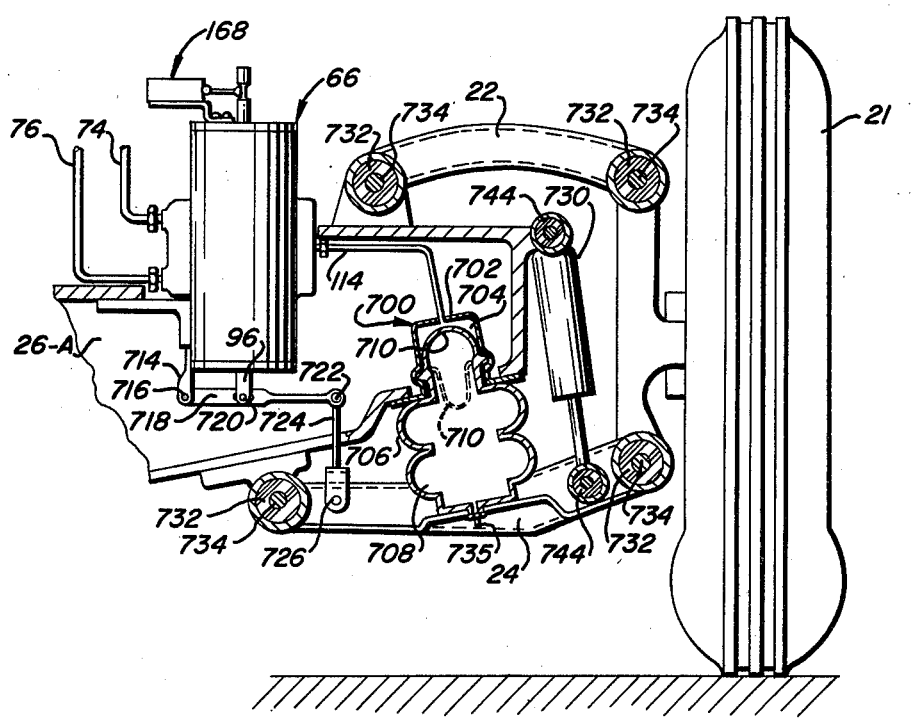
FIG. 8 is a diagrammatic view of a suspension system incorporating a hydraulic-pneumatic spring means and comprising still another aspect thereof.

Reference is next made to FIG. 8 which illustrates a modification of the system of FIG. 1–3 wherein an oil over air or hydraulic-pneumatic spring means 700 is utilized instead of the air spring 44 of FIG. 1.

In the embodiment of FIG. 8 the same control valve 66, switch means 168, and circuit of FIGS. 2 and 3 are mounted on a modified vehicle frame 26-A arranged to mount the air-oil spring means 700 that comprises a sealed air chamber 708 separated from a sealed oil chamber 704 by a flexible or movable wall 710.

An oil line 114 delivers or releases oil from oil chamber 704 formed by a metal inverted cup shaped housing 702 responsive to the position of spool member 104 in valve member 66 or 68, FIGS. 1 and 2.

Referring again to FIG. 8, a shock absorber 730 is connected between frame 26-A a lower control arm 24 at the rubber bushed pivot pins 744. The control arms 22 and 24 are mounted to the frame and axle member at pivot pins 734 which are isolated from surrounding collars on the arms by rubber bushings 732.

Actuation of rod 96 of valve means 66 and 68 is accomplished by lever 718 and a rod 724, the latter being connected to lever 718 at pivot 722 and to lower control arm 24 at pivot pin 726.

Lever 768 is mounted to frame 26–A at a pivot pin 716 and the lower end of valve rod 96 includes a slot and pin connection 720 with said lever.

The electrical and fluid circuit for the modification of FIG. 8 is the same as for the modification of FIGS. 1–3. Oil, however, is used as the fluid and the expansion or contraction of flexible wall 710, upon the admission or release of oil to and from chamber 704 changes the pressure in air chamber 708, formed by flexible wall 706, and thereby effects changes in the distance between the sprung and unsprung weights as may be required by the sensing means and control system.

Figure 4:
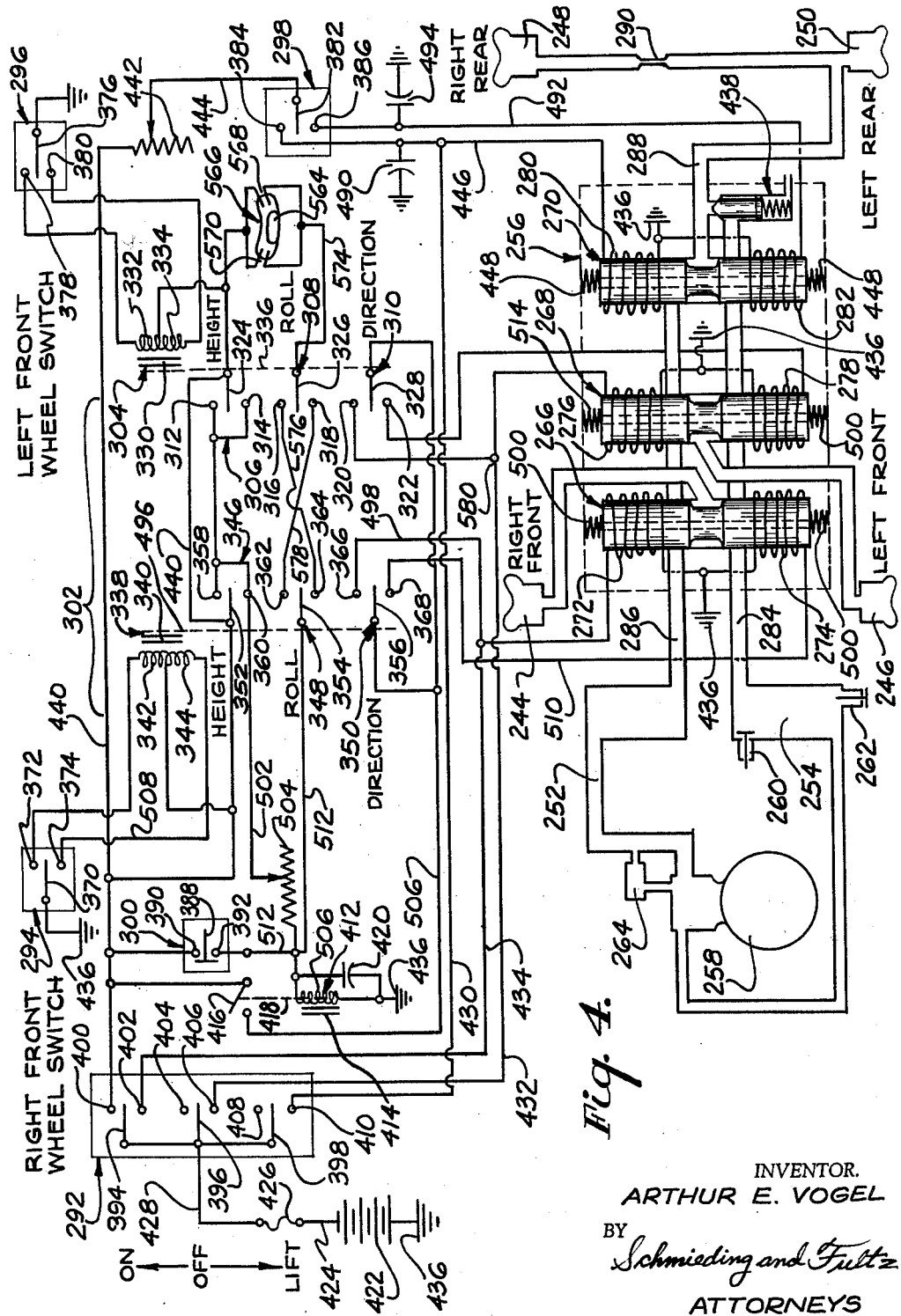
FIG. 4 is a diagrammatic view of a second suspension system constructed according to the present invention and comprising a second aspect thereof.

Reference is next made to FIG. 4 which diagrammatically illustrates another suspension system, constructed according to the present invention, said system including a plurality of air springs 244, 246, 248, and 250 which are operative between the sprung and unsprung weight of a vehicle and appropriately indicated in FIG. 4 as "right front," "left front," "right rear," and "left rear." The air springs receive air from a high pressure reservoir 252 and discharge air to a low pressure reservoir 254. A valve means indicated generally at 256 serves to control the flow of air to and from the air springs.

A compressor 258 receives air from low pressure reservoir 254 and charges high pressure reservoir 252 as required. It will be noted that low pressure reservoir 254 includes an intake valve 260 for admitting make-up air and a pressure relief valve 262.

Compressor 258 is provided with a controller 264 that serves to maintain high pressure reservoir 252 at a substantially constant predetermined pressure. A compressor of this type is disclosed and described in detail in my co-pending application Serial No. 541,337 filed October 19, 1955, now Patent No. 3,038,739.

With continued reference to FIG. 4, valve means 256 includes three solenoid actuated spools 266, 268, and 270, said spools being of the three-position closed center type.

The solenoids 272, 274, 276, 278, 280, and 282 serve to shift the spools 266, 268, and 270 to left positions wherein certain of the air springs are connected to low pressure reservoir 254 via a line 284 or to right positions wherein certain of the air springs are connected to high pressure reservoir 252 via a line 286.

It will be noted from FIG. 4 that spool 266 controls the flow of air to and from only the right front air spring 244. Spool 268 controls the flow of air to and from only the left front air spring 246. Spool 270, however, controls the flow of air to and from both the right rear and left rear air springs 248 and 250 via a line 288 provided with restriction 290, said line being connectable with either high pressure line 286 or low pressure reservoir return line 284.

Restriction 290 in line 288 is provided to prevent the rapid transfer of air between the rear air springs 248 and 250 when the vehicle is negotiating a curve or encounters bumps. Hence the transfer of air between the rear air springs can occur only with time duration as may be required when height corrections are to be made.

The control of valve 256 is electrically accomplished primarily by an on-off-lift switch indicated generally at 292, a right front wheel switch indicated generally at 294, a left front wheel switch indicated generally at 296, a rear wheel switch indicated generally at 298, and a hydraulic brake switch indicated generally at 300.

The secondary or completing circuits are effected in a main relay assembly indicated generally by the bracket 302, said assembly including a left relay indicated generally at 304, a left height switch indicated generally at 306, a left roll switch indicated generally at 308 and a left direction switch indicated generally at 310. These switches include stationary contacts 312, 314, 316, 318, 320, and 322 and movable contacts 324, 326, and 328, said three movable contacts being simultaneously actuated by an armature 330 of left relay 304. Relay 304 includes an upper coil 332 and a lower coil 334. When upper coil 332 is energized an actuating link 336 moves upwardly and causes movable contacts 324, 326, and 328 to bridge upper stationary contacts 312, 316, and 320. Conversely, when lower coil 334 is energized actuating link 336 moves downwardly and causes the movable contacts to bridge the lower stationary contacts 314, 318, and 322.

With continued reference to FIG. 4, relay assembly 302 includes a right relay indicated generally at 338 that comprises an armature 340 and upper and lower coils 342 and 344. The right height, roll, and direction switches are indicated generally at 346, 348, and 350, and include movable contacts 352, 354, and 356 arranged to bridge stationary contacts 358, 360, 362, 364, 366, and 368.

Armature 338 actuates movable contacts 352, 354, and 356, so as to bridge either the upper stationary contacts or the lower stationary contacts responsive to signals received from right front wheel switch 294 in a manner later to be described herein.

Similarly, left relay 304 actuates movable contacts 324, 326, and 328 to bridge either the upper stationary contacts or the lower stationary contacts responsive to signals received from left front wheel switch 296 as will be later described herein.

It will be noted that right front wheel switch 294 includes a movable contact 370 and upper and lower stationary contacts 372 and 374. Left front wheel switch 296 includes a movable contact 376 and upper and lower stationary contacts 378 and 380.

Rear wheel switch 298 includes a movable contact 382 and upper and lower stationary contacts 384 and 386.

Brake switch 300 includes a movable contact 388 which on pressurization of the hydraulic brake system, bridges stationary contacts 390 and 392.

On-off-lift switch 292 is of the three-pole, three-position type and includes movable contacts 394, 396, and 398 and stationary contacts 400, 402, 404, 406, 408, and 410.

The system of FIG. 4 further includes a relay actuated switch 416 that is connected by means of an actuator link 418 to an armature 414 of a relay indicated generally at 412. Relay 412 is shunted by a capacitor 420.

The system of FIG. 4 is adapted to lift the sprung weight of the vehicle relative to the unsprung weight and thereby increase road clearance, as may sometimes be desired particularly with low silhouette vehicles, and this is easily accomplished by the driver in merely shifting on-off-lift switch 292 to "lift" position which commonly connects stationary contacts 402, 406, and 410 with movable contacts 394, 396, and 398. In this position it will be understood that the current will flow from battery 422 via wire 424, fuse 426, wire 428, simultaneously through contacts 394, 396, 398, to contacts 402, 406, and 410. Wire 430 conducts current to coil 280 and thence to ground 436. Similarly, wire 432 completes the circuit to coil 276 which is connected to ground 436. Wire 434 completes the circuit to coil 272 which is also connected to ground 436.

When coils 280, 276, and 272 are energized, by shifting switch 292 to the "lift" position, all three spools 266, 268, and 270 will be shifted to the right whereby the necked portions of the spools connect all four of the air springs 244, 246, 248, and 250 with high pressure reservoir 252.

With continued reference to FIG. 4, a lift limit valve indicated generally at 438 is operable between the high pressure side of the circuit and the low pressure side of the circuit, that is between lines 288 and 284, whenever the switch 292 is in the "lift" position. This lift limit valve 438 prevents subjecting the air springs to excessive pressures, that is pressures higher than required to sustain the car at a predetermined maximum elevation.

The circuit for causing height variations at the rear portions of the vehicle is manually effected by shifting on-off-lift switch 292 to the "on" position wherein current flows from battery 422 through line 424, fuse 426, line 428, movable contact 394, stationary contact 400, wire 440, variable resistor 442, wire 444, movable contact 382, of the rear wheel switch, and one of the stationary contacts 384 or 386 depending on whether the sprung weight of the vehicle is high or low relative to the normal configuration datum line.

At this time it should be pointed out that rear wheel switch 298 is operatively connected between the sprung and the unsprung weight at the rear of the vehicle such that when the rear portion of the unsprung weight is above normal configuration datum line, movable contact 382 is caused to bridge stationary contact 386. Conversely, if the rear of the sprung weight is too low, movable contact 382 bridges stationary contact 384.

Assuming that the sprung weight of the vehicle is too low, with respect to normal configuration datum, then movable contact 382 is mechanically actuated to bridge stationary contact 384 and energize coil 280 via wire 446 and ground 436. Spool 270 is thereby shifted to the right whereby the necked portion of the rear air spring 248 and 250 is connected with high pressure reservoir 252 via lines 286 and 288. Air is thereby admitted to the rear air springs and continues to flow to the springs until movable contact 382 is mechanically moved away from stationary contact 384 at which time the circuit to coil 280 is broken and spool 270 is centered in the normally closed position by springs 448. It will be understood that spool 270 is centered when the sprung weight of the vehicle has been returned to normal configuration datum.

Assuming the rear portion of the sprung weight of the vehicle is too high, that is above normal configuration datum, then movable contact 382 will bridge stationary contact 386 and energize left coil 282 via wire 492 and coil 282 to ground 436. This connects the rear air springs 248 and 250 with low pressure reservoir 254 via lines 288 and 284. After the rear air springs have been sufficiently drained to return the rear portion of the sprung weight to normal configuration datum then contact is broken between movable contact 382 and stationary contact 386 causing spool 270 to return to its normal centered position under the bias of springs 448.

With continued reference to height corrections at the rear wheels it is necessary to provide means for rendering the valve means 256 insensitive to height variations of low time duration such as would occur when the vehicle encounters road irregularities. This is achieved by the inclusion of variable resistor 442 in series with coils 280 and 282 and by capacitor 490 and 494 in parallel with the two coils 280 and 282 respectively. Due to the inclusion of the variable resistor and capacitors, it will be understood that a predetermined time interval is required to sufficiently energize either coil 280 or coil 282 to overcome the centering action of springs 448 and effect a right or left shift of spool 270.

The system of FIG. 4 is further adapted to effect height corrections at the front of the vehicle either independently or simultaneously at the two front air springs 244 and 246. Assuming that the right front air spring is insufficiently pressurized to maintain the right front portion of the sprung weight at normal configuration datum, and assuming that on-off-lift switch 292 is in the "on" position then right front wheel switch 294 will bridge stationary contact 372 and thereby energize right relay 338 via battery 422, line 424, fuse 426, wire 428, movable contact 394, stationary contact 400, wire 440, coil 342, stationary contact 372, and movable contact 370 to ground 436. This causes armature 340 of relay 338 to shift upwardly whereby actuator link 496 moves movable direction contacts 352, 354, and 356 upwardly and into engagement with stationary contacts 358, 362, and 366. This completes a circuit from wire 440, movable contact 352, stationary contact 358, wire 502, variable resistor 504, and coil 506 of relay 412 to ground. This closes relay actuated switch 416 whereby current can flow from wire 440, relay actuated switch 416, wire 506, movable contact 356, stationary contact 366, wire 498, wire 434, coil 272 to ground 436 whereby spool 266 is shifted to the right to connect right front air spring 244 with high pressure reservoir 252. This causes air to flow to the air spring until the right front portion of the sprung weight has been raised to normal configuration datum at which time right front wheel switch 294 is centered in a "dead band" zone. This breaks the circuit to coil 272 which permits spring 500 to center spool 266 whereby the flow of air to right front air spring 244 is terminated.

Here again, valve means 256 and particularly spool 266 is rendered insensitive to road imposed irregularities of short time duration by inclusion of the previously mentioned variable resistor 504 and capacitor 420, it being understood that a time interval is required to overcome the variable resistance and charge the capacitor sufficiently to actuate relay 412.

With continued reference to FIG. 4, assuming that right front air spring 244 is excessively pressurized whereby the right front portion of the sprung weight is above normal configuration datum, the right front wheel switch 294 senses such variation and if the variation is of sufficient time duration an appropriate correction will be made by shifting spool 266 to the left upon energization of left coil 274. Coil 274 is energized via battery 422, line 424, fuse 426, line 428, movable contact 394, stationary contact 400, line 440, coil 344 of relay 338, wire 508, stationary contact 374, movable end contact 370 to ground 436. This causes armature 340 to shift downwardly whereby movable contacts 352, 354, 356 bridge stationary contacts 360, 364, and 368. This completes a circuit from wire 440 to coil 506 of relay 412 via wire 440, movable contact 352, wire 502, variable resistor 504 and coil 506 of relay 412 to ground 436. This closes relay actuated switch 416 which completes a circuit through wire 440, switch 416, wire 506, movable contact 356, stationary contact 368, wire 510 and left coil 274 to ground 436. This shifts spool 266 to the left whereby right front air spring 244 is drained to low pressure reservoir 254. When the right front sprung weight has been lowered to normal configuration datum right front wheel switch 294 centers itself at a "dead band" breaking contact to left coil 274 whereby spool 266 is centered under the biasing action of spring 500.

Height corrections at left front air spring 246 are effected by the admission or release of fluid upon appropriate shifting of spool 268 either to the right or to the left respectively. Left front wheel switch 296 functions, like right front wheel switch 294, to energize a three-position normally centered left relay 304 which in turn actuates switches 306, 308, and 310 which function in the manner previously described in connection with right switches 346, 348 and 350.

It will be understood that both the right front and left front air springs 244 and 246 can be either simultaneously drained or pressurized or one can be drained and the other pressurized depending on the connections being made at right front wheel switch 294 and left front wheel switch 296.

With continued reference to FIG. 4, when an anti-nose dive correction is required, such as during a braking operation, hydraulic brake switch 300 will be closed since movable contact 388 is actuated upon an increase in the hydraulic brake system. Anti-nose dive corrections are accomplished, in general, by pressurizing the two fluid air springs 244 and 246 to compensate for forwardly directed thrust loads encountered during braking action.

Here again, the front sprung weight portion is thereby maintained at normal configuration datum both when braking operations are being instituted and released. It should be pointed out that the previously described time delay necessary in effecting height corrections is not incorporated in the circuit for effecting anti-nose dive corrections since, in the latter case, it is imperative that the corrections be instantly applied responsive to any departures from normal configuration datum.

When brake switch 300 is closed, relay 412 is instantly energized to close relay actuated switch 416 via battery 422, line 424, fuse 426, wire 428, movable contact 394, stationary contact 400, wire 440, switch 300, wire 512, relay coil 506 to ground 436.

This makes current available at line 506 and both movable direction switch contacts 356 and 328. Hence it will be understood that when switches 294 and 296 close due to the downward departure of the forward sprung weight from normal configuration datum then armatures 340 and 330 are shifted upwardly whereby direction switches 350 and 310 energize coils 272 and 276. This simultaneously pressurizes the right and left front air springs 244 and 246 to offset the previously mentioned forwardly directed thrust.

After a braking operation has been instituted, and while the car is being decelerated, right front wheel switch and left front wheel switch 294 and 296 will be opened as soon as sufficient air has been admitted to the front air springs 244 and 246 to raise the front sprung weight to normal configuration datum and this configuration will be maintained throughout the deceleration period.

After the vehicle has come to a complete stop and the driver releases brake switch 300 this opens and breaks the circuit to relay 412 whereby relay actuated switch 416 opens, after a time delay imposed by capacitor 420. This cuts off the current to direction switches 350 and 310 whereby coils 272 and 276 are de-energized permitting springs 500 and 514 to center spools 266 and 268.

The previously mentioned time delay is provided to maintain relay actuated switch 416 closed and current available at movable contacts 356 and 328 so that the valve means 256 can be operated, even though the brake switch is released, to relieve excessive air pressure in front air springs 244 and 246 in order to permit the front end to stay at normal configuration datum.

In view of the foregoing, it will be understood that the anti-nose dive circuit just described not only instantaneously applies anti-nose dive corrections but also eliminates unpleasant transition sensations during braking operation and at the termination thereof.

Reference is next made to FIG. 4 for purposes of describing how anti-roll corrections are effected by this system.

Assuming the vehicle is negotiating a curve to the right, the right side of the sprung weight of the vehicle will tend to rise and the left side will tend to drop relative to normal configuration datum.

It should be pointed out that stationary contacts 372 and 374 of right front wheel switch 294 will move upwardly with the sprung weight of the vehicle while movable contact 370 is held stationary or movable contact 370 can be thought of as moving downwardly by the unsprung weight so as to engage stationary contact 374. At the same time stationary contacts 378 and 380 of left front wheel switch 296 will move downwardly with the sprung weight or movable contact 376 can be thought of as moving upwardly with the unsprung weight to cause movable contact 376 to engage stationary contact 378.

With the above mentioned contacts being established at the wheel switches 294 and 296 right relay 338 and left relay 304 are energized in the manner previously described in discussing height corrections.

Since contact was made at the right front wheel switch between lower stationary contact 374 and movable contact 370 the lower coil 344 of relay 338 is energized causing armature 340 to move downwardly and cause the movable contacts of switches 346, 348, and 350 to engage the lower contacts 360, 364, and 368 respectively.

At the same time, since contact at the left front wheel switch is made between upper stationary contact 378 and movable contact 376 the upper coil 332 of left relay 304 is energized causing armature 330 to move upwardly and make contact between the movable contacts of switches 306, 308, and 310 and the upper stationary contacts 312, 316, and 320.

Since the vehicle is curving to the right a blob of mercury 564 in a mercury switch indicated generally at 566 is displaced to the left so as to bridge contacts 568.

With the above described connections being completed at the right and left front wheel switches 294 and 296, at the roll switches 348 and 308, and at inertia responsive mercury switch 566 it will be understood that the circuit for energizing valve means 256 is completed via battery 422, wire 424, fuse 426, switch 292, wire 440, contact 568 of mercury switch 566, wire 574, movable contact 326, stationary contact 316, wire 576, stationary contact 364, movable contact 354, wire 512, coil 506 of relay 412 to ground 436. This closes relay actuated switch 416 and causes current to flow directly, without time lag, to movable contacts 356 and 328 of direction switches 350 and 310 via wire 506.

Since direction switch 350 has energy available and movable contact 356 is in engagement with stationary contact 368 current will flow to coil 274 via wire 510. This causes spool 266 to shift to the left and place right front air spring 244 in connection with low pressure reservoir 254.

Energy is also available to left direction switch 310 and since movable contact 328 is in engagement with stationary contact 320 current will flow to coil 276 via wire 580. This causes spool 268 to shift to the right and place left front air spring 246 in connection with high pressure reservoir 252.

With the air spring at the outer side of the curve being pressurized and with the air spring at the inner side of the curve being drained, the sprung weight of the vehicle will be maintained at normal configuration datum under the inertia forces being encountered and right front wheel switch 294 and left front wheel switch 296 will open so long as the inertia forces remain constant under the established correction.

It should be pointed out, with the vehicle in a curve and anti-roll corrections established, that valve means 256 remains operable, and capable of making corrections, for a predetermined time interval after wheel switches 294 and 296 and switches 348 and 308 open due to the inclusion of the previously mentioned holding circuit that includes capacitor 420.

Moreover, spool 266 that controls the flow of air to right front air spring 244 is instantly and independently responsive, without time delay, to its respective right front wheel switch 294, for said time interval, and left front spool 268 is instantly and independently responsive to its respective left wheel switch 296 even though any or all roll switches 348 and 308 and inertia responsive mercury switch 566 may be open.

This is important since while turning, the vehicle may encounter conditions, for short intervals of time, during which centrifugal forces are released and yet corrections are required or during which the sprung weight is level and yet corrections are required without annoying transition sensations being imposed on the passengers.

It should be pointed out that the series connection between the two roll switches 348 and 308 and the inertia responsive mercury switch 566 is fundamentally necessary in the circuit in order to prevent wheel switches 294 and 296 from constantly commanding the valve means to operate under road irregularities. Hence the roll control circuit is normally not energized unless both tilting of the sprung weight and inertia forces simultaneously occur. However, once the vehicle has entered a curve and the equilibrium corrections have been established it is necessary to take care of certain variables in body tilt and centrifugal force without time delay being present in the circuit. Hence the holding circuit including capacitor 420 takes care of these special conditions during curving and makes it possible to continuously make momentary corrections even though the previously mentioned series connection between roll switches 348 and 308 and mercury switch 566 is not continuously maintained. Such momentary corrections are required, for example, when the driver of the vehicle momentarily straightens the vehicle and relieves inertia forces and then resumes the curved attitude. Another example occurs when one of the wheels encounters a prolonged depression in the road while the vehicle is cornering. Still another example occurs at curve exit when the driver straightens the car and thereby removes inertia forces since mercury switch 566 will at this time be opened and break the series connection, that isolates time delay, it being understood that time delay would be present were it not for the inclusion of the holding circuit containing capacitor, which holding circuit makes it possible for the wheel switches to instantly actuate their respective spools.

It will be understood that if the spools 266 and 268 were not instantly responsive to the wheel switches 294 and 296 then the vehicle would proceed along the road, after curve exit, in a listed configuration for the previously described time delay period inasmuch as the system has been returned to height sensing which always includes time delay.

The elimination of time delay, in effecting roll corrections, is of paramount importance, for reason of safety, when the driver is rapidly negotiating an S curve. It is obvious that here a reverse correction is immediately needed with the result that any time delay dangerously prevents unloading of stored energy at a time when its release is most urgently needed.

It should be mentioned that the connections made and the flow of current in making roll correction for left cornering is identical to those just described during right cornering except that different combinations of switching are effected causing opposite corrections to be effected by valve means 256.

In summary, it will be understood that the control systems of the present invention, although constantly subjected to a multiplicity of variables, are inherently adapted to react only to specific combinations of variables which dictate the requirement for certain specific corrections. Moreover, the system includes a time delay feature which is under certain conditions desirable and under certain other conditions unnecessary and undesirable. The system is, however, adapted to both apply and eliminate the time delay as required whereby a highly effective and transition free control system is achieved.

Figure 5:
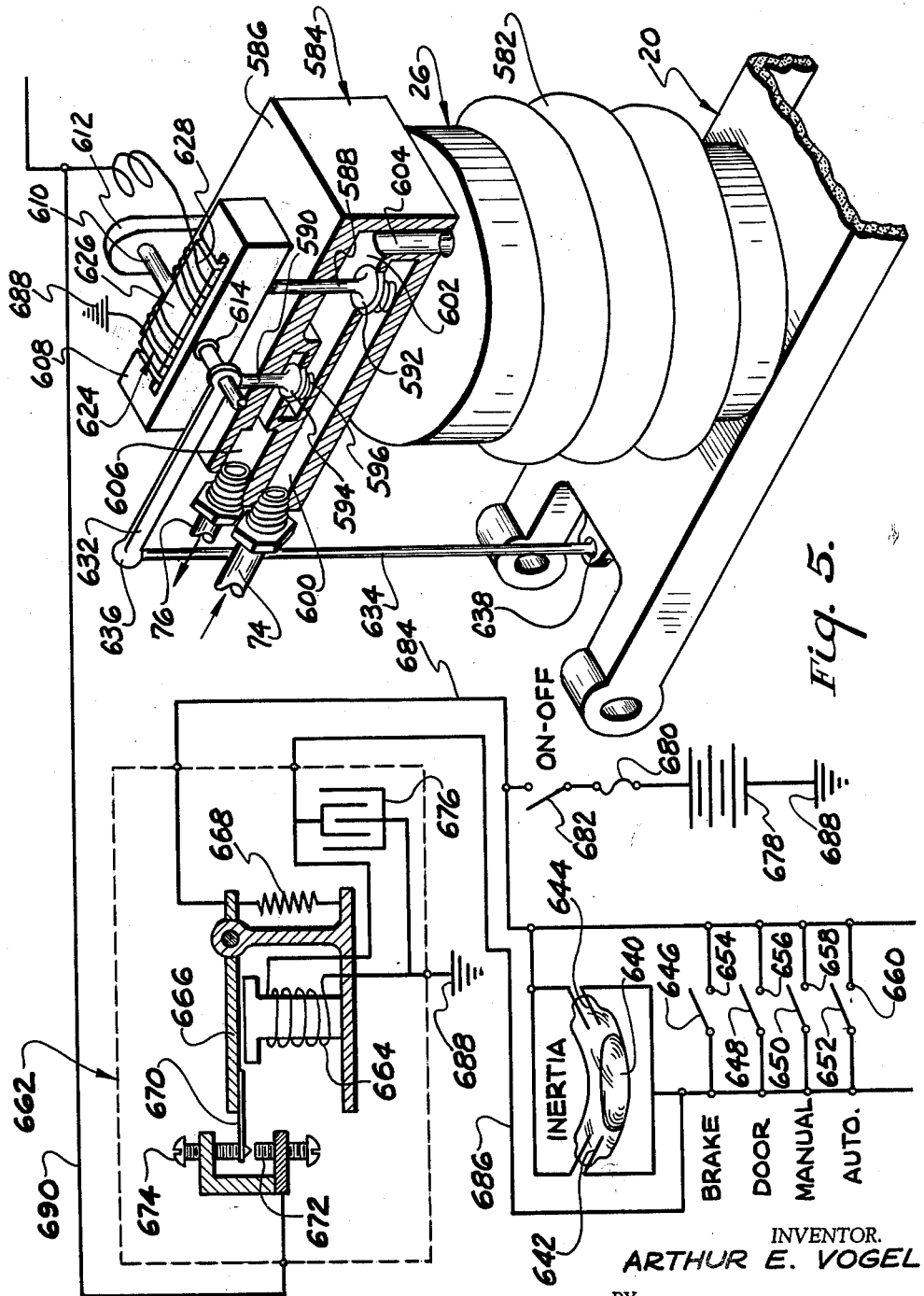
FIG. 5 is a perspective view of an air spring and poppet valve means associated with an electrical control circuit, said air spring valve means and circuit being constructed according to the present invention and comprising another aspect thereof.
Figure 6:
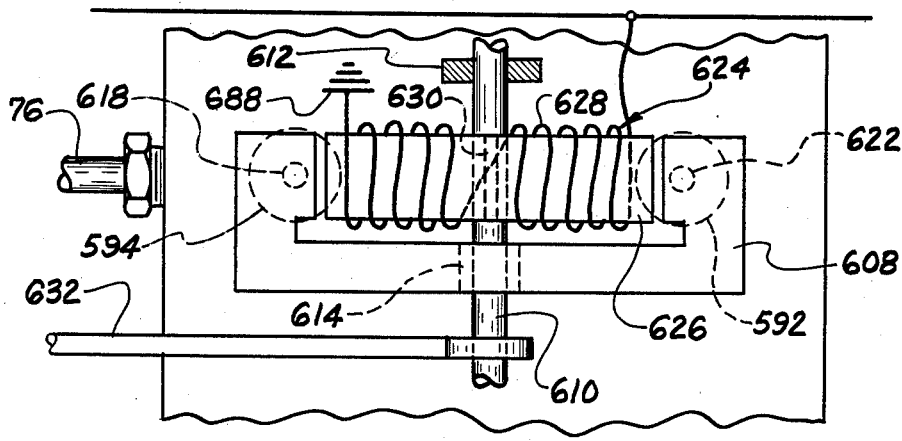
FIG. 6 is a top elevational view of the poppet valve means of FIG. 5.
Figure 7:
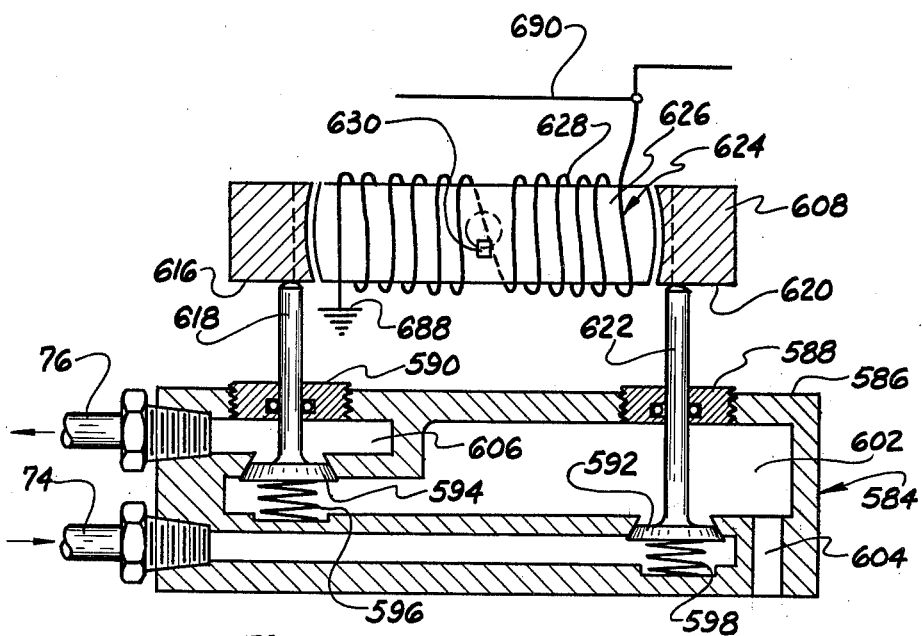
FIG. 7 is a side elevational view, partially in section, of the poppet valve means of FIG. 5.

Reference is next made to FIGS. 5 through 7 which illustrate another control system constructed according to the present invention. Here again, the unsprung weight is indicated generally at 20 and the sprung weight or frame is indicated generally at 26. An air spring 582 is shown operatively positioned between said sprung and unsprung weights.

The embodiment of FIGS. 5 through 7 can be considered as being used in the air circuit of the system of FIG. 1 with high pressure line 74 and low pressure line 76, of FIG. 1, being also shown in FIG. 5. The valve mechanism and control circuit of FIG. 5 can also be used with various other fluid sources without departing from the spirit of the present invention.

With reference to FIGS. 5 through 7, the system comprises a valve means indicated generally at 584 that includes a housing 586 that forms an inlet valve guide 588, and an exhaust valve guide 590. An intake poppet valve 592 and an exhaust poppet valve 594 are normally closed by compression springs 596 and 598. Inlet valve 592, when opened, admits air to the interior of air spring 582 via line 74 and passages 600, 602, and 604. Air is released via passages 604, 602, 606, and line 76.

With continued reference to FIG. 5, an armature 608 is mounted for free pivotal movement on a shaft 610, said shaft being rotatably mounted in a journal 612 supported on valve housing 586. It should be pointed out that armature 608 is freely rotatable on shaft 610 at a bearing 614.

With reference to FIG. 7, the under surface of armature 608 includes a left surface 616 that engages a stem 618 of valve 594 and further includes a right surface 620 that engages a stem 622 of valve 592.

With continued reference to FIGS. 5 through 7, the system further includes an electro-magnet indicated generally at 624 that includes a core 626 and a coil 628.

It will be understood that when the coil 628 of electro-magnet 624 is energized, it will be magnetically coupled with armature 608 such that the electro-magnet and armature will move together as a unit, it being understood that the core 626 of the electro-magnet is keyed to shaft 610 at a key 630. An arm 632 has one end keyed to shaft 610 and the other end pivotally connected to a rod 634 at a ball joint 636, the lower end of said rod being connected to the unsprung weight 20 at a second ball joint 638. It will now be understood that any relative movements between the sprung and unsprung weights will rotate shaft 610 and move electro-magnet 624 and in instances where the electro-magnet and the armature 608 are magnetically coupled the valves 594 and 598 will be actuated to either admit or release fluid to the interior of air spring 582.

With continued reference to FIG. 5, the circuit includes a plurality of parallel switches indicated at "inertia," "brake," "door," "manual," and "auto."

The inertia switch includes a blob of mercury 640 and two pairs of contacts 642, and 644. The other switches include movable contacts 646, 648, 650, and 652 and stationary contacts 654, 656, 658, and 660.

The system of the present invention further includes a holding relay indicated generally at 662 that includes a coil 664, and an armature 666 that is normally urged towards the open position illustrated by a spring 668. Armature 666 carries a movable contact 670 that is engageable with a stationary contact 672 upon energization of coil 664. The gap between contact 670 and 672 is adjustable by means of a screw 674.

The holding relay 662 further includes a capacitor 676 that is connected in parallel with the coil 664.

Valve means 584 like the valve means 66 of FIG. 1 is not actuated when the vehicle encounters road irregularities and only becomes effective when electro-magnet 624 is magnetically coupled with armature 608. The valve means 584 of FIG. 5, however, is arranged to actuate poppet valves instead of the sleeve type valve of FIG. 1. It should be pointed out that the poppet valves are more effective in sealing against air leakage than the sleeve type valve.

In operation, if the vehicle is undergoing a braking operation, the brake switch will be closed, by hydraulically coupling same to the fluid brake system, whereby movable contact 646 bridges stationary contact 654. This completes the circuit to holding relay 662, via battery 678, fuse 680, manual on-off switch 682, wire 684, contacts 654, and 646 of the brake switch, wire 686, coil 664 to ground 688.

With relay 662 energized armature 666 moves downwardly and bridges contacts 670 and 672. This completes the circuit to the electro-magnet 624 via wire 684, armature 666, contact 670, contact 672, wire 690, and coil 628 to ground 688. With the electro-magnet 624 energized valve 584 is maintained operative to admit and release air to air spring 582 as may be required to maintain the sprung weight of the vehicle at normal configuration datum.

When the contacts 646 ad 654 of the brake switch are opened, holding relay 662 will function to maintain valve 584 operative for a predetermined time interval sufficient to normalize the pressures, after braking, in a manner previously described herein.

The contacts 656 and 648 of the "door" switch are closed when passengers enter or leave the vehicle whereby the relay is energized to permit height corrections under variations in static load.

The "manual" switch is mounted on the dashboard or at some other location convenient to the driver and when contacts 650 and 658 are bridged the electro-magnet will be energized to permit height corrections as may be required due to losses of air, consumption of fuel, or any condition that might cause the vehicle to depart from normal configuration datum.

The switch marked "auto" can be included or substituted for the "manual" switch as desired. The "auto" switch can be cyclically intermittently operated by a clock device, by the odometer present in the vehicle, or other suitable means.

The "inertia" switch is mounted on the vehicle with its longitudinal axis disposed transversely of the longitudinal axis of the vehicle such that either of the contacts 642 or the contacts 644 are bridged when the vehicle enters a curve. Upon the bridging of either sets of contacts electro-magnet 624 is instantaneously energized whereby valve means 584 is rendered operative to make the appropriate variations in pressure at its respective air spring as may be required to maintain the sprung weight at normal configuration datum.

It should be pointed out that due to the inclusion of capacitor 676 holding relay 662 maintains electro-magnet 624 energized for a predetermined time interval after any of the switches have been opened so that the valve means 584 can continue to make corrections for said time interval for reasons previously discussed in detail herein.

In summary, the system of FIGS. 5 through 7 is adapted to effect all of the corrections that are accomplished by the more complex systems of FIGS. 1 through 4. The system of FIGS. 5 through 7, however, is less complex and less expensive at the sacrifice of fully automatic operation.

It should be pointed out that although the various systems illustrated include resilient means in the form of flexible chambers containing a compressible fluid such as air the same novel valve means illustrated, such as the sleeve valve means 66–68 of FIG. 2 and the poppet valve means 584 of FIG. 5, can be used to control the flow of fluid to and from hydro-pneumatic units which include sealed air chambers associated with hydraulic chambers. The valve means 66–68 and 584 would in systems of this type serve to control the flow of fluid to and from the oil chambers with the variation in the amount of oil present in said chambers serving to vary the bias of the sealed air chamber so as to maintain the sprung weight portion of the vehicle at normal configuration datum. Hydro-pneumatic units of this type are disclosed in detail in my co-pending applications Serial No. 577,777 filed April 12, 1956, now Patent No. 3,036,844, and Serial No. 620,102 filed November 2, 1956, now Patent No. 3,065,976.

The valve means and control systems of the present invention can also be used for controlling the types of automotive suspensions that include springs in the form of torsion bars. In systems of this type a fluid actuated cylinder is operatively interposed between an end of a torsion bar spring and either the sprung or unsprung weight of the vehicle and fluid is admitted or released to or from the fluid actuated cylinder to wind or unwind the torsion bar as may be required to maintain the sprung weight of the vehicle at normal configuration datum. Torsion bar spring suspensions, and associated fluid actuated cylinders, of this type are illustrated and explained in detail in my co-pending application Serial No. 801,863 filed March 21, 1959, now Patent No. 3,104,114.

While the forms of embodiments of the present invention as herein disclosed constitute preferred forms, it is to be understood that other forms might be adopted, all coming within the scope of the claims which follow.

I claim:

1. A control system for a vehicle suspension of the type that includes sprung and unsprung weight portions with a resilient means interposed between said weight portions, said control system comprising, in combination, valve means mounted on one of said weights for controlling the flow of fluid to and from said resilient means and including a flow control element moveable between a "centered" position, an "up" position, and a "down" position; said flow control element including a first electro-magnetic coupling portion; an actuator element connected to the other of said weights and including a second electro-magnetic coupling portion; means forming a source of electrical energy; and switch means in circuit with one of said electro-magnetic coupling portions for magnetically connecting and disconnecting said coupling portions.

2. A control system for a vehicle suspension of the type that includes sprung and unsprung weight portions with a resilient means interposed between said weight portions, said control system comprising, in combination, valve means mounted on one of said weights for controlling the flow of fluid to and from said resilient means and including a flow control element moveable between a "centered" position, an "up" position, and a "down" position, said flow control element including a first electro-magnetic coupling portion; an actuator element connected to the other of said weights and including a second electro-magnetic coupling portion; means forming a source of electrical energy; and switch means in circuit with one of said electro-magnetic coupling portions for magnetically connecting and disconnecting said coupling portions; and a holding relay in circuit with said switch means and electro-magnetic coupling for maintaining said electro-magnetic coupling energized for a time interval after said switch means has been opened.

3. A control system for a vehicle suspension comprising, in combination, sprung and unsprung weight portions; a resilient means operative between said weights and including a fluid chamber; valve means for controlling the flow of fluid to and from said chamber; a first actuator for shifting said valve means and moveable between a "centered" position, and "up" position, and a "down" position; a second actuator operatively associated with said unsprung weight and moveable between a "centered" position, an "up" position, and a "down" position; an electro-magnet mounted on one of said actuators; an armature mounted on the other of said actuators; means forming a source of electrical energy; and switch means for connecting and disconnecting said electro-magnet with said source.

4. A control system for a vehicle suspension comprising, in combination, sprung and unsprung weight portions; resilient means operative between said weights and including a fluid chamber; valve means for controlling the flow of fluid to and from said chamber; a first actuator for shifting said valve means and moveable between a "centered" position, an "up" position, and a "down" position; a second actuator operatively associated with said unsprung weight and moveable between a "centered" position, an "up" position, and a "down" position; an electro-magnet mounted on one of said actuators; an armature mounted on the other of said actuators; means forming a source of electrical energy; switch means for connecting and disconnecting said electro-magnet with said source; and a holding relay in circuit with said switch means and electro-magnet for maintaining said electro-magnet energized for a time interval after said switch means has been opened.

5. A control system for a vehicle suspension comprising, in combination, sprung and unsprung weight portions; a resilient means operative between said weights and including a fluid chamber; valve means including an intake poppet valve for controlling the flow of fluid to said chamber and an exhaust poppet valve for controlling the release of fluid from said chamber; a first actuator for said poppet valves and moveable between a "centered" position, an "up" position, and a "down" position; a second actuator for said poppet valves, said second actuator being operatively associated with said unsprung weight and moveable between a "centered" position, an "up" position, and a "down" position; an electro-magnet mounted on one of said actuators; an armature mounted on the other of said actuators; means forming a source of electrical energy; and switch means for connecting and disconnecting said electro-magnet with said source.

6. A control system for a vehicle suspension comprising, in combination, sprung and unsprung weight portions; resilient means operative between said weights and including a fluid chamber; valve means including an intake poppet valve for controlling the flow of fluid to said chamber and an exhaust poppet valve for controlling the release of fluid from said chamber; a first actuator for said poppet valves and moveable between a "centered" position, an "up" position, and a "down" position; a second actuator for said poppet valves, said second actuator being operatively associated with said unsprung weight and moveable between a "centered" position, an "up" position, and a "down" position; an electro-magnet mounted on one of said actuators; an armature mounted on the other of said actuators; means forming a source of electrical energy; switch means for connecting and disconnecting said electro-magnet with said source; and a holding relay in circuit with said switch means and electro-magnet for maintaining said electro-magnet energized for a time interval after said switch means has been opened.

7. In a suspension system for a vehicle having a sprung weight portion and an unsprung weight portion, the combination of resilient means connected between said sprung and unsprung weight portions, said resilient means including fluid actuated means for varying the force exerted by said resilient means between said weight portions; means forming a source of pressurized fluid; means forming a reservoir; valve means mounted to one of said weight portions and including a cylinder provided with an intake port connectable with said source, and an exhaust port connectable with said reservoir, and a third port connectable with said fluid actuated means; a sleeve member slidably carried in said cylinder and including a centered position wherein said intake and exhaust ports are isolated from said third port, a first shifted position wherein said third port is connected with said intake port, and a second shifted position wherein said third port is connected with said exhaust port; means for biasing said sleeve in said centered position; a rod member slidably extended into said cylinder and connected to the other of said weight portions; an electro-magnetic coupling operative between said sleeve member and rod member; means forming a source of electrical energy; and switch means operative between said source of electrical energy and said electro-magnetic coupling.

8. In a suspension system for a vehicle having a sprung weight portion and an unsprung weight portion, the combination of resilient means connected between said sprung and unsprung weight portions, said resilient means including fluid actuated means for varying the force exerted by said resilient means between said weight portions; means forming a source of pressurized fluid; means forming a port connectable with said source, and an exhaust port reservoir; valve means mounted to one of said weight portions and including a cylinder provided with an intake port connectable with said source, and an exhaust port connectable with said reservoir, and a third port connectable with said fluid actuated means; a sleeve member slidably carried in said cylinder and including a centered position wherein said intake and exhaust ports are isolated from said third port, a first shifted position wherein said third port is connected with said intake port, and a second shifted position wherein said third port is connected with said exhaust port; means for biasing said sleeve in said centered position; a rod member slidably extended into said cylinder and connected to the other of said weight portions; an electro-magnet mounted on said rod member and shiftable relative to said sleeve; means forming a source of electrical energy; and switch means operative between said source of electrical energy and said electro-magnet.

9. The apparatus defined in claim 7 that includes a holding relay in circuit with said switch means and electro-magnetic coupling for maintaining said electro-magnetic coupling energized for a time interval after said switch means has been opened.

10. The apparatus defined in claim 7 wherein a check valve is operatively located between said third port and said exhaust port when said sleeve member is in said centered position.

11. The apparatus defined in claim 8 that includes a holding relay in circuit with said switch means and electro-magnet for maintaining said electro-magnet energized for a time interval after said switch means has been opened.

12. The apparatus defined in claim 8 wherein a check valve is operatively located between said third port and said exhaust port when said sleeve member is in said centered position.

13. The apparatus defined in claim 1 wherein said resilient means includes a flexible air chamber and said means for restoring and releasing energy is in the form of an air flow control valve means.

14. The apparatus defined in claim 1 wherein said resilient means includes a flexible chamber containing a compressible fluid; and a rigid chamber containing a non-compressible fluid associated wtih said flexible chamber, said means for restoring and releasing energy being in the form of a flow control valve means for said non-compressible fluid.

15. The apparatus defined in claim 3 wherein said resilient means includes a flexible air chamber and said valve means controls the flow of air to and from said chamber.

16. The apparatus defined in claim 3 wherein said resilient means includes a sealed chamber containing a compressible fluid; and a rigid chamber containing a non-compressible fluid, said valve means serving to control the flow of non-compressible fluid to and from said rigid chamber.

17. The apparatus defined in claim 5 wherein said resilient means includes a flexible air chamber and said poppet valves control the flow of air to and from said chamber.

18. The apparatus defined in claim 5 wherein said resilient means includes a sealed chamber containing a compressible fluid; and a rigid chamber containing a non-compressible fluid, said poppet valves serving to control the flow of non-compressible fluid to and from said rigid chamber.

19. In a suspension system for a vehicle having a sprung weight and an unsprung weight portions, the combination of a right resilient means connected between said sprung and unsprung weight portions on the right side of said vehicle, said right resilient means including a right fluid actuated means for varying the force exerted by said right resilient means between said portions; a left resilient means connected between said sprung and unsprung weight portions on the left side of said vehicle, said left resilient means including a left fluid actuated means for varying the force exerted by said left resilient means between said portions; a right valve means on one of said weight portions for controlling the flow of fluid to and from said right fluid actuated means, said right valve means including a movable right flow control element; a left valve means on said one weight portion for controlling the flow of fluid to and from said left fluid actuated means, said left valve means including a movable left flow control element; a right electro-magnetic means for connecting said right flow control element to the other of said weight portions; a left electro-magnetic means for connecting said left flow control element to said other of said weight portions; means forming a source of electrical energy; a first right switch means including a movable contact connectable with either an upper contact or a lower contact; a second right switch means including a movable contact connectable with either an upper contact or a lower contact; means for moving said movable contacts upwardly and downwardly responsive to corresponding movements between said weight portions at the right side of said vehicle; a first left switch means including a movable contact connectable with either an upper contact or a lower contact; a second left switch means including a movable contact connectable with either an upper contact or a lower contact; means for moving said movable contacts upwardly and downwardly responsive to corresponding movements between said weight portions at the right side of said vehicle; a conductor connecting the movable contact of one of said first right and left switches with said source; a conductor connecting the other of said first right and left switches with ground; a conductor connecting the upper contact of one of said first switches with the lower contact of the other of said first switches; a conductor connecting the lower contact of said one of said first switches with the upper contact of said other of said first switches; a conductor commonly connecting all of said upper and lower contacts of said second right and left switches; a conductor connecting the movable contacts of said second right and left switches with said source; a conductor connecting one of said upper contacts of said second right and left switches with ground; a normally open relay actuated switch in circuit between said source and said electro-magnetic means; and a relay for operating said relay actuated switch, said relay being in circuit with certain of said first and second right and left switches.

20. The apparatus defined in claim 19 wherein a normally open inertia responsive switch is in series with said first right and left switches.

21. The apparatus defined in claim 19 wherein a resistor is connected in series between said second right and left switches and the field of said relay.

22. The apparatus defined in claim 19 wherein the field of said relay is shunted by a capacitor.

23. The apparatus defined in claim 19 wherein a resistor is connected in series between said second right and left switches and the field of said relay and wherein the field of said relay is shunted by a capacitor.

24. The apparatus defined in claim 19 wherein a resistor is connected in series between said second right and left switches and field of said relay, wherein the field of said relay is shunted by a capacitor; and wherein an inertia responsive switch is connected in series between said first right and left switches and the field of said relay with the circuit between said inertia responsive switch and said field by-passing said resistor.

25. The apparatus defined in claim 19 wherein a normally open brake actuated switch is connected between said source and the field of said relay.

26. A control system for a vehicle suspension comprising, in combination, sprung and unsprung weight portions; means forming a source of electrical energy; a right resilient means operative between said weight portions and including a right fluid chamber; a right valve means for controlling the flow of fluid to and from said right chamber; a left resilient means operative between said weight portions and including a left fluid chamber; a left valve means for controlling the flow of fluid to and from said left chamber; a right electro-magnetic switch actuator, said right switch actuator including an armature having a centered position, an up position, and a down position; a left electro-magnetic switch actuator, said left switch actuator including an armature having a centered position, an up position, and a down position; a right normally open height switch including a movable contact having a centered position, an up position wherein said movable contact engages an upper stationary contact, and a down position wherein said movable contact engages a lower stationary contact; a right roll switch including a movable contact having a centered position, an up position wherein said movable contact engages an upper stationary contact, and a down position wherein said movable contact engages a lower stationary contact; a right direction switch including a movable contact having a centered position, an up position wherein said movable contact engages an upper stationary contact, and a down position wherein said movable contact engages a lower stationary contact, the movable contacts of said right switches being connected to the armature of said right switch actuator; a left normally open height switch including a movable contact having a centered position, an up position wherein said movable contact engages an upper stationary contact, and a down position wherein said movable contact engages a lower stationary contact; a left roll switch including a movable contact having a centered position, an up position wherein said movable contact engages an upper stationary contact, and a down position wherein said movable contact engages a lower stationary contact; a left direction switch including a movable contact having a centered position, an up position wherein said movable contact engages an upper stationary contact, and a down position wherein said movable contact engages a lower stationary contact, the movable contacts of said left switches being connected to the armature of said right switch actuator; a right electromagnetic valve actuator for said right valve means and in circuit with certain of said right height, roll, and direction switches; a left electro-magnetic valve actuator for said left valve means and in circuit with certain of said left height, roll, and direction switches; a normally open right wheel switch including a movable contact having a centered position, an up position wherein said movable contact engages an upper stationary contact, and a down position wherein said movable contact engages a lower stationary contact, said right wheel switch means being operatively connected between said sprung and unsprung weights and in circuit with the field of said right switch actuator; and a normally open left wheel switch including a movable contact having a centered position, an up position wherein said movable contact engages an upper stationary contact, and a down position wherein said movable contact engages a lower stationary contact, said left wheel switch means being operatively connected between said sprung and unsprung weights and in circuit with the field of said left switch actuator.

27. The apparatus defined in claim 26 that includes a normally open relay operated switch in series with certain of said height, roll, and direction switches; a holding relay for closing said normally open relay operated switch; and a resistor in series connection with the field of said holding relay.

28. The apparatus defined in claim 26 that includes a normally open relay operated switch in series with certain of said height, roll, and direction switches; a holding relay for closing said normally open relay operated switch, the field of said holding relay being shunted by a capacitor.

29. The apparatus defined in claim 26 that includes a normally open relay operated switch in series with certain of said height, roll, and direction switches; a holding relay for closing said normally open relay operated switch; and a resistor in series connection with the field of said holding relay, the field of said holding relay being shunted by a capacitor.

30. The apparatus defined in claim 26 wherein said right and left roll control switches and an inertia responsive switch are connected in series with said electro-magnetic switch actuators.

31. The apparatus defined in claim 26 that includes a rear resilient means disposed between said sprung and unsprung weight portions; a rear valve means for controlling the flow of fluid to and from said rear resilient means; a rear electro-magnetic valve actuator for said rear valve means; and a normally open rear height switch operatively interposed between said sprung and unsprung weights and in circuit with said rear electro-magnetic valve actuator.

32. The apparatus defined in claim 26 that includes a rear resilient means disposed between said sprung and unsprung weight portions; a rear valve means for controlling the flow of fluid to and from said rear resilient means; a rear electro-magnetic valve actuator for said rear valve mean; a normally open rear height switch operatively interposed between said sprung and unsprung weights and in circuit with said rear electro-magnetic valve actuator; and a lift switch in circuit with said right, left, and rear electro-magnetic valve actuators, the actuation of said lift switch serving to shift said right, left, and rear valve means to positions wherein said valve means connect said resilient means with said source.

33. A control system for a vehicle suspension of the type that includes sprung and unsprung weight portions with a resilient means including a fluid chamber interposed between said weight portions, said control system comprising, in combination, valve means mounted on one of said weights for controlling the flow of fluid to and from said resilient means and including a flow control means moveable between a "centered" position for sealing said fluid chamber, and "up" position for delivering fluid to seat fluid chamber, and a "down" position for draining fluid from said fluid chamber; means normally biasing said flow control means toward said "centered" position; electro-magnetic coupling means for shifting said valve means to said "up" position and to said "down" position; means forming a source of electrical energy; switch means in circuit with said electro-magnetic coupling means; and an actuator connected to said switch means and the other of said weights, said switch means including a first switch for energizing said magnetic coupling means responsive to centrifugal force encountered by said vehicle and a second switch for energizing said magnetic coupling means responsive to variations in static loading of said vehicle.

34. A control system for a vehicle suspension of the type that includes sprung and unsprung weight portions with a resilient means interposed between said weight portions, said control system comprising, in combination, valve means mounted on one of said weights for controlling the flow of fluid to and from said resilient means and including a flow control means moveable between a "centered" position, an "up" position, and a "down" position; means normally biasing said flow control means toward said "centered" position; electro-magnetic coupling means for shifting said valve means to said "up" position and to said "down" position; means forming a source of electrical energy; switch means in circuit with said electro-magnetic coupling means; an actuator connected to said switch means and the other of said weights; a holding relay in circuit with said switch means and electro-magnetic coupling means for maintaining said coupling means energized for a time interval after said switch means has been opened by said actuator.

References Cited by the Examiner
UNITED STATES PATENTS

| | | | |
|---|---|---|---|
| 1,297,236 | 3/19 | Peiler. | |
| 1,518,894 | 12/24 | Bliss | 251—137 X |
| 2,593,040 | 4/52 | Lloyd. | |
| 2,849,242 | 8/58 | Allison. | |
| 2,882,068 | 4/59 | Fairver. | |
| 2,895,743 | 7/59 | Jackson. | |
| 2,291,160 | 2/60 | Lautzenhiser. | |
| 2,922,634 | 2/60 | Shedd | 280—124 X |

FOREIGN PATENTS 1,213,756  11/59  France.

A. HARRY LEVY, *Primary Examiner.*

WILLIAM KANOF, PHILIP ARNOLD, LEO FRIAGLIA, *Examiners.*